United States Patent [19]

Iwasa

[11] Patent Number: 5,143,772
[45] Date of Patent: Sep. 1, 1992

[54] RUBBER SHAPED ARTICLES HAVING A FINISHING LAYER AND A PROCESS FOR PRODUCTION THEREOF

[75] Inventor: Tadanobu Iwasa, Ichinomiya, Japan

[73] Assignee: Toyoda Gosei Co., Ltd., Nishigasugai, Japan

[21] Appl. No.: 654,032

[22] Filed: Feb. 12, 1991

[30] Foreign Application Priority Data

| Feb. 19, 1990 | [JP] | Japan | 2-37883 |
| Feb. 19, 1990 | [JP] | Japan | 2-37884 |
| Feb. 19, 1990 | [JP] | Japan | 2-37885 |
| Feb. 19, 1990 | [JP] | Japan | 2-37886 |
| Feb. 19, 1990 | [JP] | Japan | 2-37887 |
| Feb. 19, 1990 | [JP] | Japan | 2-37888 |
| Feb. 21, 1990 | [JP] | Japan | 2-39938 |

[51] Int. Cl.⁵ .................. B32B 3/04; B32B 3/26; B32B 25/04; E06B 7/16
[52] U.S. Cl. .................. 428/122; 264/45.9; 428/31; 428/188; 428/316.6; 428/317.5; 428/358; 428/515; 428/520; 49/475; 49/497; 49/498
[58] Field of Search .......... 49/475, 497, 498; 264/45.9; 428/31, 122, 188, 316.6, 317.5, 358, 515, 520

[56] References Cited

U.S. PATENT DOCUMENTS 4,603,899 8/1986 Iwasa .................. 428/188
4,929,481 5/1990 Iwasa .................. 428/122

Primary Examiner—William J. Van Balen
Attorney, Agent, or Firm—Cushman, Darby & Cushman

[57] ABSTRACT

A rubber shaped article having a finishing layer which comprises
  a main body of rubber shaped article made of EPDM,
  a finishing layer of a PVC composition formed on the main body, and
  an adhesive layer formed between the main body and the finishing layer, said adhesive layer comprising 40 to 80% by weight of NBR, 20 to 40% by weight of EPDM and 0 to 35% by weight of SBR; and a process for producing said rubber shaped article.

The rubber shaped article of the present invention provides internal and external automotive trims having an improved decorative design, with high productivity.

10 Claims, 5 Drawing Sheets

RUBBER SHAPED ARTICLES HAVING A FINISHING LAYER AND A PROCESS FOR PRODUCTION THEREOF

BACKGROUND OF THE INVENTION

1. Field of the Invention

The present invention relates to rubber shaped articles comprising a rubber shaped product made of EPDM and a finishing layer of gelatinized PVC formed thereon, and a process for producing the same.

The rubber shaped articles having a finishing layer of the present invention can be used as internal and external automotive trims such as glass weather strip (FIG. 2), side mole (FIG. 3), glass outer, glass inner, glass run and window frame rubber in addition to such weather strips as shown in FIGS. 1, 2, 6, 8, 9, 12 and 13.

2. Background Information

Many of the main bodies of weather strips used in automobiles and the like are usually made of EPDM from the viewpoint of weather resistance, ozone resistance, heat resistance, etc.

Because of the recent growing demand for improvement in the decorative design of automobiles, it is desirable in some cases that the surface to be decorated with a weather strip is finished to become the same cloth-like or leather-like surface as that of the internal trim. In this case, there is a method comprising attaching cloth or leather to the surface to be decorated (see Japanese Utility Model Registration Unexamined Publication No. 62-88655).

In addition, owing to the recent growing demand for improvement in the decorative design of automobiles, there is an eager desire for the advent of a weather strip with a decorative surface having a bright and subdued, black or chromatic color.

PVC paste for solidification cannot impart softness with respect to touch and appearance and cannot sufficiently satisfy the demand for goods of higher grade.

However, it has been substantially impossible to obtain a bright and subdue, black or chromatic color on the surface of a rubber shaped article without a treatment after shaping because of characteristics of the rubber material itself.

In addition, it has been difficult to form a layer of PVC paste gelatinized by heating, directly on a rubber substrate made of EPDM, with satisfactory adhesion. Therefore, the formation of said layer requires pretreatments such as buffing and primer treatment of a vulcanized rubber surface. These pretreatments require a large number of steps.

Furthermore, for finishing the surface to be decorated of a rubber substrate (a weather strip) to make the same, for example, cloth-like, the surface to be decorated of the rubber substrate after vulcanization should be subjected to a large number of steps such as buffing, defatting, primer coating, coating with an adhesive, attachment of cloth, curing of the adhesive, etc. Therefore, the productivity is not satisfactory.

A list of the abbreviations of polymers, plastisizers and the like used in the present specification is shown below.

NBR—α,β-unsaturated nitrile-conjugated diene copolymer rubber a typical example of which is nitrile rubber.

EPDM—ethylene-α-olefin-non-conjugated diene copolymer rubber a typical example of which is ethylene-propylene-diene ternary rubber.

SBR—aromatic vinyl compound-conjugated diene copolymer rubber a typical example of which is styrene-butadiene rubber.

PVC—polyvinyl chloride.

DOP—dioctyl phthalate.

SUMMARY OF THE INVENTION

An object of the present invention is to provide a rubber shaped article having a finishing layer which is satisfactory in adhesion between the rubber shaped product and the finishing layer formed of a PVC gelatinized layer without pretreatments requiring a large number of steps, can have softness of the finishing layer, and can sufficiently satisfy the demand for goods of higher grade; and a process for producing said rubber shaped article.

Another object of the present invention is to provide a rubber shaped article having a decorative coating layer which can have a cloth-like or leather-like decorative surface on a rubber substrate made of EPDM with high productivity; and a process for producing the same.

Still another object of the present invention is to provide a process for finishing a rubber extruded article to make the same cloth-like by which a rubber extruded article can be finished to be cloth-like with high productivity by attaching cloth to the surface to be decorated of a solid rubber portion.

Further objects and advantages of the present invention will be clear from the description that follows.

In one embodiment, the present invention relates to an article of manufacture comprising
(a) an EPDM rubber substrate,
(b) a PVC layer formed on the substrate, and
(c) an adhesive layer binding the PVC layer to the substrate comprising a rubber blend of NBR, EPDM, and optionally SBR.

In another embodiment, the present invention relates an article of manufacturing comprising a rubber shaped article having a finishing layer comprising
a main body of rubber shaped article made of EPDM;
a finishing layer of a PVC composition formed on the main body; and
an adhesive layer formed between the main body and the finishing layer, said adhesive layer comprising 40 to 80% by weight of NBR, 20 to 40% by weight of EPDM and 0 to 35% by weight of SBR.

In another embodiment, the present invention relates to a rubber shaped article that preferably includes those in which the PVC composition for the finishing layer is of a foamed type.

Said rubber shaped article also includes those in which the adhesive is of a foamed type.

Furthermore, said rubber shaped article includes those in which the finishing layer contains short fiber or natural leather powder and is like fabric or leather.

In a further embodiment, the present invention relates to a process for producing an article of manufacture comprising a main body made of EPDM compounded rubber and a PVC layer formed on the substrate which are united in a body through an adhesive layer, said process comprising
a step of forming the adhesive layer which comprises a rubber blend of NBR, EPDM, and optionally SBR, on said main body of shaped article;

a step of forming the finishing layer of the PVC layer on the adhesive layer;

a vulcanization step; and a heating step.

Preferably, the process comprises producing a rubber shaped article comprising a main body of rubber shaped article made of EPDM-based compounded rubber and a finishing layer made of a PVC composition which are united in a body through an adhesive layer, said process comprising a step of forming the adhesive layer which comprises 40 to 80% by weight of NBR, 20 to 40% by weight of EPDM and 0 to 35% by weight of SBR on the main body of rubber molded article;

a step of forming the finishing layer of the PVC composition on the adhesive layer;

a vulcanization step; and a heating step.

preferably, the step of vulcanization with heating is carried out after the step of forming the adhesive layer on the main body of shaped article, immediately after which the step of forming the finishing layer is carried out.

The step of forming the finishing layer is carried out preferably by sprinkling powdered PVC on the adhesive layer.

In addition, the step of forming the finishing layer is carried out preferably by coating the PVC composition on the adhesive layer.

1—rubber substrate,
3—finishing coating layer,
5—adhesive layer,
D—surface to be decorated.

Figure 4:
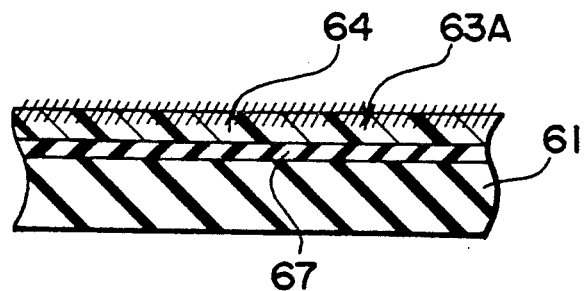

FIG. 4 is a model cross-sectional view of the rubber shaped article of the present invention in which the finishing layer is like fabric.

Figure 5:
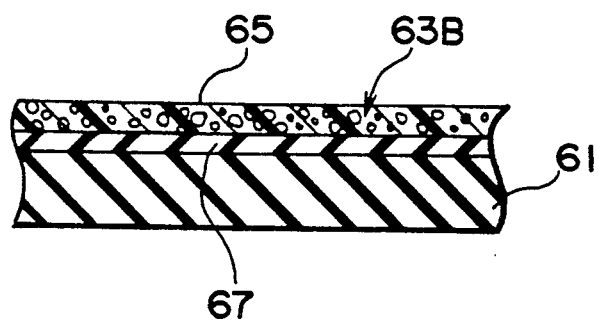

FIG. 5 is a model cross-sectional view of the rubber shaped article of the present invention in which the finishing layer is like cloth.

Figure 6:
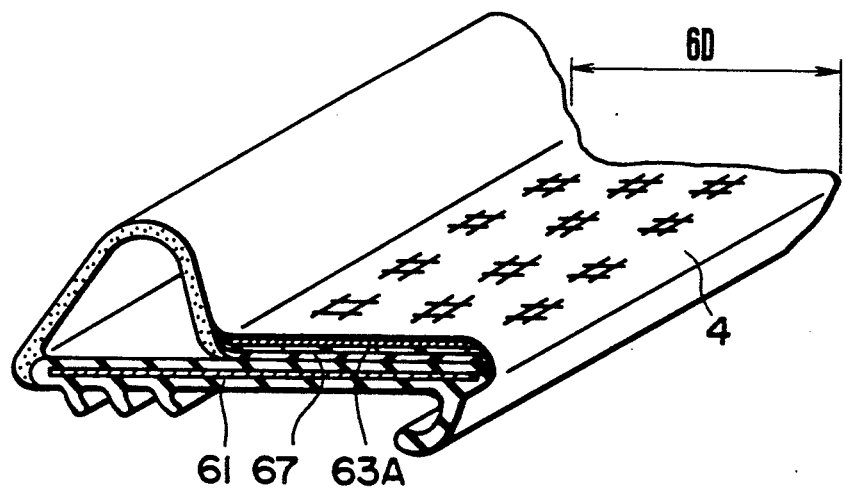

FIG. 6 is a sectional perspective view of a door weather strip which is one example of a shaped article to which the present invention is applicable.

61—a rubber substrate,
63A and 63B—finishing coating layers,
67—adhesive layer,
6D—surface to be decorated,
64—short fiber,
65—natural leather powder.

Figure 7:
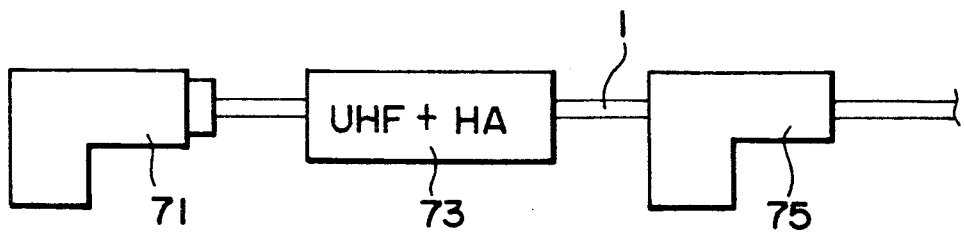

FIG. 7 is a schematic flow diagram showing the process for producing a rubber shaped article of the present invention.

Figure 8:
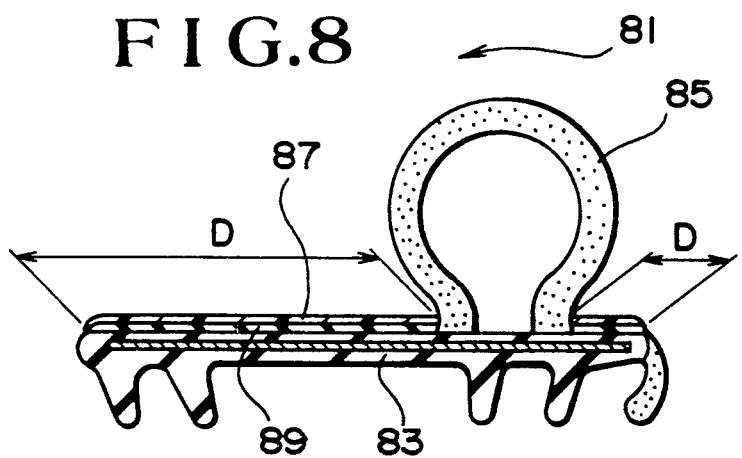

FIG. 8 is a cross-sectional view showing one example of a weather strip produced according to the production process of the present invention.

Figure 9:
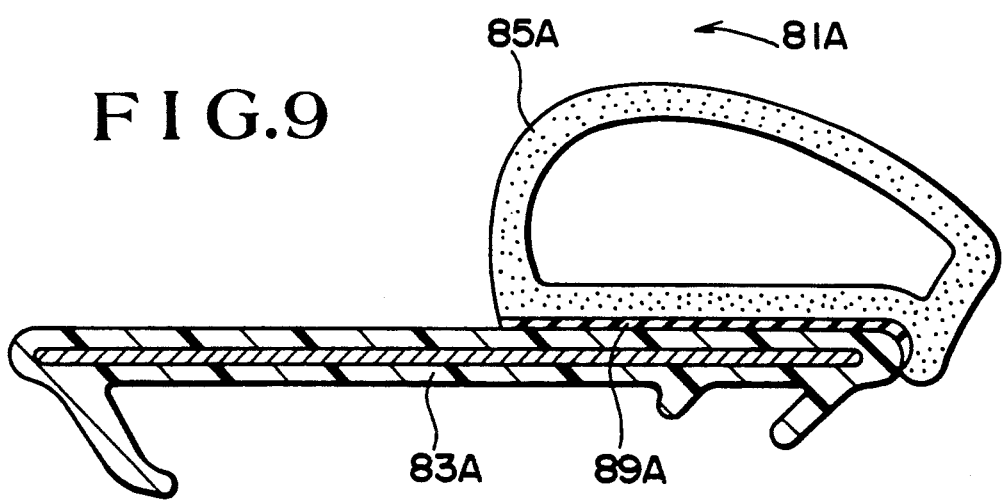

FIG. 9 is a cross-sectional view showing another example of a weather strip produced according to the production process of the present invention.

81 and 81A—main bodies of weather strip,
83—trim portion (rubber extruded portion),
83A—trim portion(resin extruded portion),
85—hollow seal portion,
85A—hollow seal portion (rubber extruded
87—finishing coating layer (resin extruded
89 and 89A—adhesive rubber layers.

Figure 10:
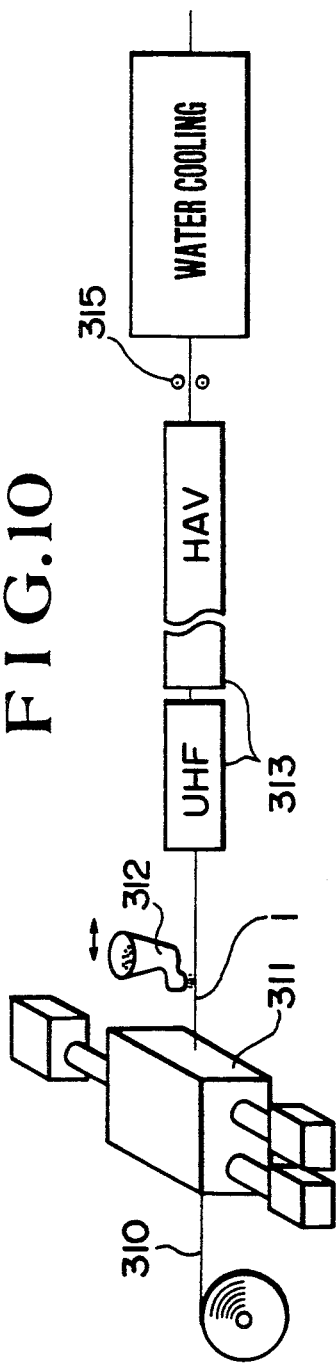

FIG. 10 is a schematic flow diagram showing the process for producing a rubber molded article having a finishing layer of the present invention.

311—cross-head type extruder for rubber,
312—vibrating feeder.

Figure 11:
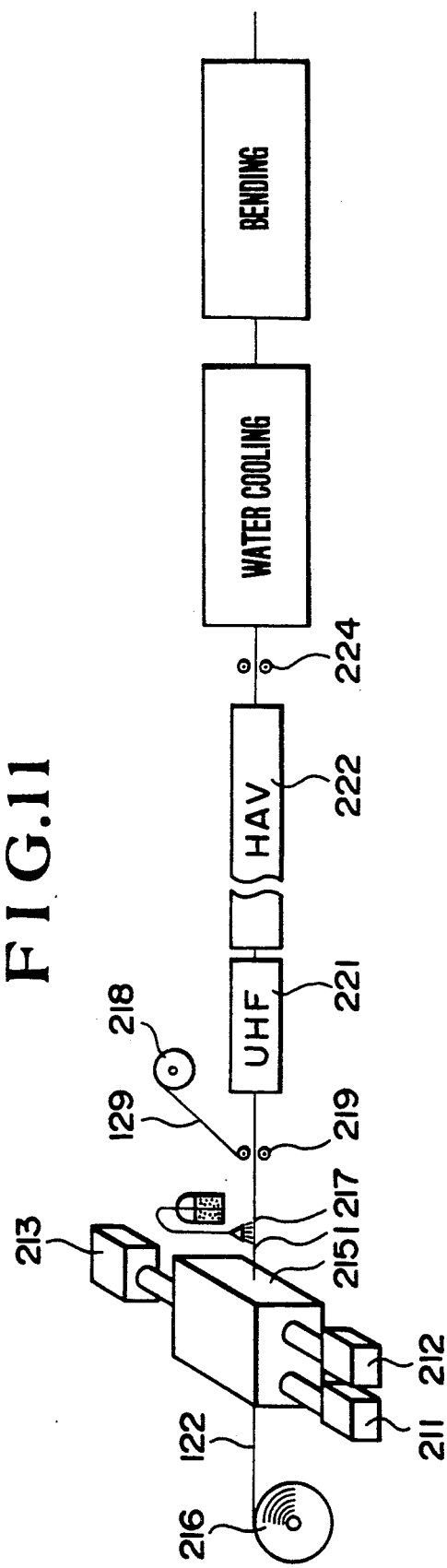

FIG. 11 is a schematic flow diagram showing the process for finishing a rubber molded article to make the same cloth-like of the present invention.

Figure 12:
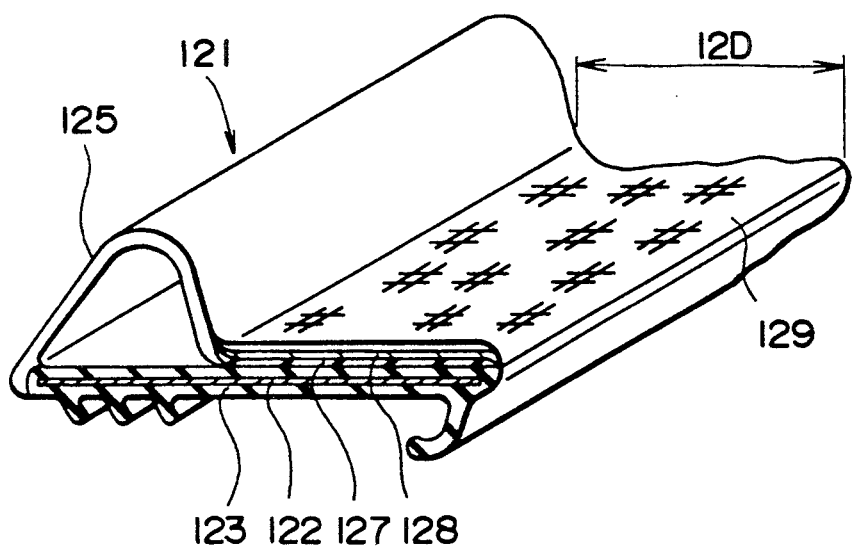

FIG. 12 is a sectional perspective view showing one example of weather strip finished to be made cloth-like by the process of the present invention.

Figure 13:
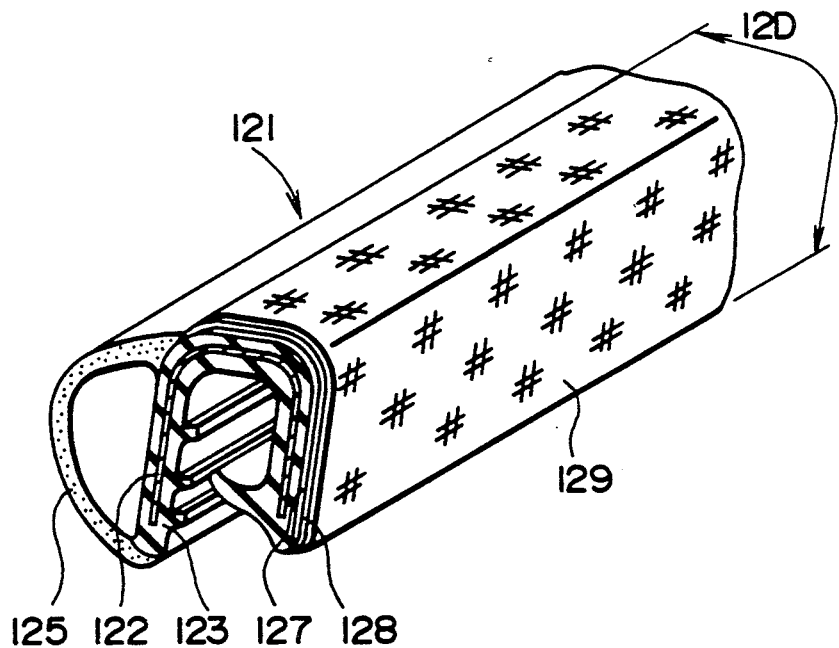

FIG. 13 is a sectional perspective view of the weather strip shown in FIG. 12 whose trim portion is bent.

121—main body of weather strip,
123—solid rubber portion,
125—sponge rubber portion.

DETAILED DESCRIPTION OF THE INVENTION

The present invention is illustrated below in detail.

In the following illustration, the units in blending, percents and parts, are all by weight unless otherwise specified.

Figure 1:
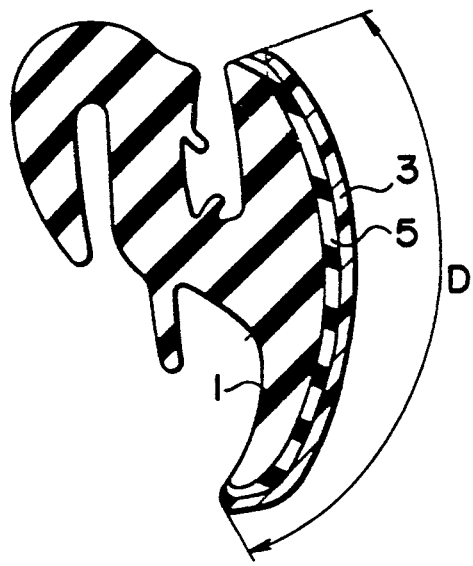
FIG. 1 is a cross-sectional view of a window weather strip which is one example of a shaped article to which the present invention is applicable.
Figure 3:
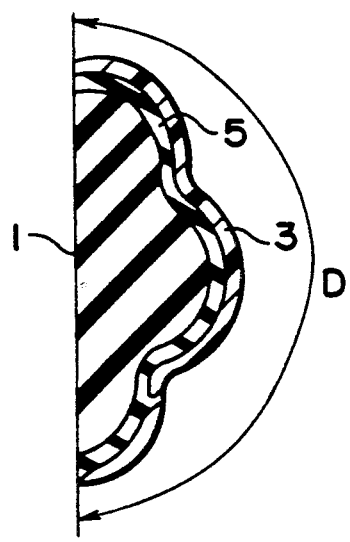
FIG. 3 is a cross-sectional view of a side mole which is still another example of shaped article to which the present invention is applicable.
Figure 2:
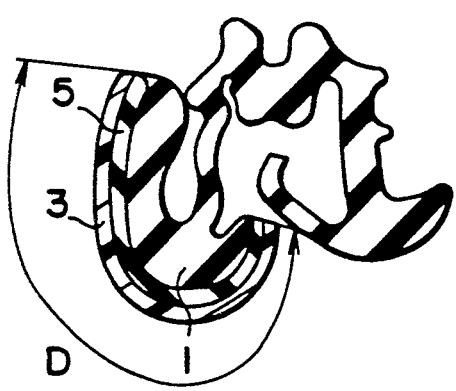
FIG. 2 is a cross-sectional view of a glass weather strip which is another example of shaped article to which the present invention is applicable.

FIGS. 1 to 3 show rubber shaped articles to which the present invention is applicable. FIGS. 1, 2 and 3 are cross-sectional views of a window weather strip, a glass weather strip and a side mole, respectively.

(1) The main body of shaped article 1 is made of EPDM.

Here, EPDM is a copolymer obtained by copolymerizing ethylene and an α-olefin (e.g. propylene) with a slight amount of a third component non-conjugated diene (e.g. ethylidenenorbornene, dicyclopentadiene, or 1,4-hexadiene) to introduce a double bond into a side chain and thereby make the copolymer sulfur-vulcanizable. Said copolymer is usually blended with supplementary materials such as reinforcing filler (carbon black or white carbon), plasticizers, lubricants, agents for vulcanization, etc. Tables 1 to 3 shows examples of recipes of usable EPDM rubber compositions.

(2) The finishing layer 3 is formed of a PVC composition on the surface to be decorated D of the main body of molded article 1.

Here, the PVC paste is a plastisol or an organosol, which is obtained by dispersing a finely pulverized resin for paste having a particle size of several micrometers or less in either a plasticizer or a dispersion medium prepared by addition of a dilluent to a plasticizer, and thereby making the resin into paste. The PVC paste is gelatinized (cured) by heating and melting after shaping. When used as a coating material, it is not changed in weight (solid content: about 100%) by a film-forming procedure as compared with solvent type coating materials, shows a larger coating build-up per coating operation, and is substantially free from defects such as a fire danger and a danger to sanitation [see "Manual of Plastics Processing Techniques", Nikkan Kogyo Shinbun Co., Ltd., p.485–488 (Dec. 20, 1977)]. The PVC composition is usually incorporated with supplementary materials such as stabilizers, carbon black or colorants (pigments or dyes), etc. In addition, for forming a PVC gelatinized layer of foamed type, the PVC composition is previously incorporated with the foaming agent described below.

As the foaming agent, there can be used conventional foaming agents which generate nitrogen gas on decomposition by heating, for example, dinitrosopentamethylenetetramine DPT) and azodicarbonamide (ADCA). The amount of the foaming agent blended is usually such that the expansion ratio of the PVC gelatinized layer becomes 1.5 to 3. It is usually 0.5 to 4 parts per 100 parts of PVC.

In the case of the PVC gelatinized layer of foamed type, softness can easily be imparted to a finishing layer with respect to touch and appearance, so that the demand for goods of higher grade can sufficiently be satisfied.

Furthermore, in the present invention, in FIGS. 1 to 6, the PVC composition may be incorporated with short fiber 64 or natural leather powder 65 to be made into a fabric-like decorative coating layer 63A or a leather-like decorative coating layer 63B, respectively.

In this case, as the short fiber (pile), there is used short fiber of nylon, polyester, rayon or the like, which has a thickness of 0.5 to 3.0 d, a length of 0.5 to 2 mm. The amount of short fiber blended is usually 50 to 100 parts per 100 parts of the paste PVC resin.

As the natural leather powder, there can be used finely pulverizized (to 1-100 μm) oxhide, cowhide, pigskin, horsehide or the like. A specific example of the natural leather powder is powder commercially available by the name of Protein Powder from Idemitsu Petrochemical Co., Ltd., etc. The amount of the natural leather powder blended is usually 20 to 80 parts per 100 parts of the paste PVC resin.

(3) In the present invention, the adhesive layer 5 made of the blended rubber described below or a composition thereof is present between the main body of shaped article 1 and the finishing coating layer 3.

Said blended rubber is composed of 40 to 80% by weight of NBR, 20 to 60% by weight of EPDM and 0 to 35% by weight of SBR.

Said blended rubber is the same as that disclosed in Jap. Pat. Appln. Kokai (Laid-Open) No. 62-17204. It is usually prepared by emulsion polymerization.

(1) When the proportion of NBR is less than 40%, the adhesive properties to the finishing layer (the PVC gelatinized layer) 3 are not sufficient. When it exceeds 80%, the adhesive properties to the main body of shaped article made of EPDM are not sufficient and the ozone resistance of the adhesive layer itself is low.

(2) When the proportion of EPDM is less than 20%, the ozone resistance of the adhesive layer itself is low. When it exceeds 60%, the adhesive properties to the finishing layer (the PVC gelatinized layer) 3 are not sufficient.

(3) When the proportion of SBR exceeds 35%, the adhesive properties to the finishing layer (the PVC gelatinized layer) are not sufficient and moreover the ozone resistance is low. Although the proportion of SBR may be 0%, blending of SBR in an amount of 2% or more improves the adhesive properties to the main body of shaped article 1 and hence is desirable.

(4) The thickness of the above-mentioned adhesive rubber layer is adjusted to 0.1 to 2 mm. When it is less than 0.1 mm, the effect of the adhesive layer can hardly be obtained. When it exceeds 2 mm, the material cost is increased and moreover characteristics of the solid rubber portion are lost. Therefore, both of such thicknesses are not desirable.

In the present invention, the gelatinized PVC may be incorporated with short fiber or natural leather powder to be made into a fabric-like decorative coating layer or a leather-like decorative layer, respectively.

As the short fiber (pile), there is used short fiber of nylon, polyester, rayon or the like, which has a thickness of 0.5 to 3.0 d and a length of 0.5 to 2 mm. The amount of the short fiber blended is usually 50 to 100 parts per 100 parts of the paste PVC resin.

As the natural leather powder, there can be used finely pulverized (to 1-100 μm) oxhide, cowhide, pigskin, horsehide or the like. A specific example of the natural leather powder is powder commercially available by the name of Protein Powder from Idemitsu Petrochemical Co., Ltd. etc. The amount of the natural leather powder blended is usually 20 to 80 parts per 100 parts of the paste PVC resin.

The above-mentioned blended rubber is usually blended with supplementary materials such as reinforcing filler (carbon black or white carbon), plasticizers, lubricants, agents for vulcanization, and optionally colorants. However, in the case of adjusting the thickness of the adhesive layer to as small as less than 0.5 mm, the blending of the supplementary materials is not indispensable when the transfer of supplementary materials such as a vulcanizing agent from the solid rubber portion 1 can be expected.

In addition, when the adhesive layer is desired to be of a foamed type, the foaming agent described below is previously blended. As the foaming agent used here, those exemplified in the case of above PVC may be used, though p,p'-oxybis(benzenesulfonylhydrazide) (OBSH) and the like can also be used. The amount of the foaming agent blended in this case is such that the expansion ratio of the adhesive layer becomes 1.5 to 3. It is usually 1 to 4 parts per 100 parts of the rubber components.

The thickness of the adhesive layer is adjusted to 0.1 to 2 mm. When it is less than 0.1 mm, the effect of the adhesive layer can hardly be obtained When it exceeds 2 mm, the material cost is increased and moreover characteristics of the main body of shaped article are lost. Therefore, both of such thicknesses are not desirable.

(4) As a process for producing the rubber shaped article of the present invention, there are the following processes.

First, the adhesive layer 5 is formed on the main body of shaped article (the main body of weather strip) 1. This process includes a process of forming the main body of shaped article (the main body of weather strip) 1 and the adhesive layer 5 by co-extrusion by using the respective materials for them.

As another process, it is also possible to form the adhesive layer 5 by another coating method such as knife coating. In addition, it is also possible to prepare the main body of shaped article by molding such as injection molding, transfer molding or compression molding and form the adhesive layer from a rubber adhesive of the same kind of rubber, thin sheet or the like by coating, pressing, etc.

Next, the finishing layer of a PVC composition is formed. As a method for this formation, there is a method of coating the PVC composition on the surface to be decorated of the main body of shaped article 1.

As a method for coating the PVC composition, there can be employed, among generally used coating methods, flow coating, brushing, dip coating, spray coating, etc. When the surface to be coated is uneven or liable to be deformed, flow coating is preferable. The amount of the PVC composition coated is such that the thickness of the resulting coating film becomes 50 to 2000 μm, depending on a required decorative design.

In this case, a multi-color finishing coating layer can be formed easily with high productivity by preparing two or more coating apparatus capable of coating PVC pastes having different colors, and coating the PVC pastes on the surface to be decorated of the main body of shaped article immediately after extrusion, in parallel with the direction of extrusion or to a predetermined length.

The PVC pastes may be incorporated with short fiber, natural leather powder or the like.

Lastly, a hot vulcanization step is carried out.

The thickness of the finishing layer 3 after gelatinization by heating is 50 to 2000 μm which is substantially the same as before gelatinization.

In addition, the hot vulcanization step can be carried out before coating the PVC composition.

That is, it is also possible to form the adhesive layer 5 on the main body of shaped article 1, conduct hot vulcanization, coat the PVC paste on the surface to be decorated D of the main body of shaped article 1, gelatinize the PVC paste by heating (foam the same at the same time), and thereby form the finishing coating layer 3.

In addition, although the step of gelatinizing the PVC paste by heating may be carried out after completion of the vulcanization of the main body of shaped article 1 and the adhesive layer 5, it is preferable from the viewpoint of thermal efficiency and productivity that the step of vulcanizing the main body of shaped article 1 and the adhesive layer serves for the step of gelatinization by heating, too (the conditions of vulcanization of the EPDM rubber a the EPDM-based compounded rubber or the conditions of gelatinization by heating of the PVC paste may be substantially the same). In this case, it becomes possible to carry out in succession the steps of formation of the rubber shaped article by extrusion, covering with the adhesive layer, formation of the PCV paste layer, and their vulcanization or gelatinization by heating. That is, it is sufficient that the main body of shaped article 1, the adhesive layer 5 and the finishing coating layer 3 are successively formed by extrusion or coating and then sent to a step of vulcanization (gelatinization by heating).

Further, the production process of the present invention is explained below by taking the case of the weather strip shown in FIG. 8 (see FIG. 7, the schematic flow diagram showing the production process).

(1) The trim portion (the rubber substrate portion) 83, the hollow seal portion 85 and the adhesive layer 89 of a main body of weather strip 81 are formed by co-extrusion with a cross-head type extruder for rubber 71 by using respective materials for them.

Then, hot vulcanization is conducted in a vulcanization tank (employing, for example, microwave vulcanization (UHF) and hot-air vulcanization (HA) simultaneously) 73 to give the main body of weather strip (an extruded product) 81 which has the adhesive layer 89 on its surface to be decorated. Only the adhesive layer 89 may be subsequently formed with another extruder.

Here, the trim portion 83 and the adhesive layer 89 are satisfactorily bonded to each other by adhesion by vulcanization to be united in one body (it can be speculated that this is because both of the polymers constituting them are of EPDM type).

Further, one example of the production process of the present invention is explained below with reference to FIG. 10.

Immediately after the formation of the adhesive layer 89 and before the hot vulcanization, a pulverized PVC composition is sprinkled on the adhesive layer 89 with a vibrating feeder 312 or the like. In this case, the adhesive layer 89 has been just formed by extrusion and its top surface is in a heated state. Therefore, the PVC composition adheres to the top surface of the adhesive layer 89, whereby a PVC powder layer can easily be formed.

Subsequently, the main body of weather strip which has the PVC powder layer formed thereon is introduced into a vulcanization tank (employing, for example, microwave vulcanization (UHF) and hot-air vulcanization (HA) simultaneously) 313. In the hot vulcanization in this case, the temperature in the tank is usually a temperature at which the PVC powder layer can be fused or melted (180° to 220° C.). The PVC powder layer is fused or melted to be smoothed, and then it is cooled and solidified to become a resin coating layer 87. If necessary, the resin coating layer 87 can be subjected to embossing treatment by passing the same between embossing rolls 315. From the viewpoint of productivity, the cooling and solidification of the resin coating layer may be carried out by means of water cooling as illustrated in FIG. 10.

In this case, the thickness of the coating, i.e., the film thickness, is adjusted to 100 to 2000 μm depending on a required decorative design.

Here, a satisfactory adhesive strength can be obtained between the adhesive layer 89 and the resin coating layer 87.

It is conjectured that the reason for this is as follows.

On the adhesive layer which has been just formed by extrusion, is substantially in an unvulcanized state and has a hot surface, the pulverized PVC composition is sprinkled to be adhered thereto, namely, the PVC powder layer is formed. Then, the fusion or melting of the PVC powder layer and the hot vulcanization of the rubber substrate and the adhesive layer are carried out at the same time. Therefore, the PVC composition has a good compatibility with the polymers constituting the adhesive layer, and moreover the vulcanizing and adhering action accompanying the vulcanization of the adhesive layer also makes a contribution.

The production process described above permits employment of successive steps of formation by extrusion and vulcanization of a weather strip. That is, it is possible to form the main body of weather strip 81 and the adhesive layer 89 simultaneously or successively, sprinkle the pulverized PVC composition on the adhesive layer, and send the thus treated main body of weather strip 81 to the hot vulcanization step.

Further, as another example of the production process of the present invention, it is also possible to introduce the aforesaid extruded product 81 into the extrusion head of an extruder for resin 15 immediately after the hot vulcanization of the extruded product 81, extrusion-coat the PVC composition on the surface to be decorated of the trim portion 83, cool the resulting coating layer, and thereby form a finishing coating layer 87.

In this case, the thickness of the coating, i.e., the film thickness, is adjusted to 50 to 2000 μm depending on a required decorative design.

Here, a satisfactory adhesive strength can be obtained between the adhesive layer 89 and the finishing coating layer (the resin extruded portion) 87.

It is conjectured that the reason for this is as follows.

The PVC composition is extrusion-coated in molten state on the adhesive layer which has just undergone hot vulcanization, has not yet undergone post-vulcanization completely and has a hot surface. Therefore, (1) as the PVC composition has a good compatibility with the polymers constituting the adhesive layer, and moreover it is not immediately solidified on the boundary surface side because of the influence of heat of the surface of the adhesive layer, so that it wets the boundary surface between it and the adhesive layer sufficiently. (2) The vulcanizing and adhering action accompanying the post-vulcanization of the adhesive layer also makes a contribution.

The production process of the present invention is further explained below with reference to FIGS. 11 to 13. A main body of extruded article 121 is formed by extrusion while forming a first adhesive layer 127 of the above-mentioned specific blended rubber or composition thereof on the surface to be decorated 12D of a solid rubber portion 123. That is, the solid portion 123, sponge rubber portion 25 and first adhesive layer 127 of the main body of weather strip 121 are formed by co-extrusion by using respective materials for them. In detail, the co-extrusion is carried out by connecting extruders 211, 212 and 213 for the solid portion, the sponge rubber portion and the first adhesive layer, respectively, to an extrusion head 215 for giving multiple colors. A feed roll 216 for an insert 122 is placed before the extrusion head 215.

Said blended rubber is composed of 40 to 80% of NBR, 20 to 60% of EPDM and 0 to 35% of SBR.

Said blended rubber is the same as that disclosed in Jap. Pat. Appln. Kokai (Laid-Open) No. 62-172043. It is usually prepared by emulsion polymerization. In detail:

(1) When the proportion of NBR is less than 40%, the adhesive properties to a second adhesive layer (a PVC paste layer) are not sufficient. When it exceeds 80%, the adhesive properties to the solid rubber portion made of EPDM and the ozone resistance are not sufficient.

(2) When the proportion of EPDM is less than 20%, the ozone resistance is low. When it exceeds 60%, the adhesive properties to the second adhesive layer (the PVC paste layer) 128 are not good.

(3) When the proportion of SBR exceeds 35%, the adhesive properties to the PVC paste are not sufficient and moreover the ozone resistance is low. Although the proportion of SBR may be 0%, blending of SBR in a proportion of 2% or more improves the adhesive properties to the solid rubber portion (the EPDM substrate) and hence is desirable.

(4) The aforesaid blended rubber is usually blended with supplementary materials such as reinforcing filler (carbon black or white carbon), plasticizers, lubricants, agents for vulcanization, and optionally colorants.

Table 8 shows a recipe for a blended rubber which may contain carbon black and can be used in the present invention. In this case, when the thickness of the first adhesive layer 127 is adjusted to as small as less than 0.5 mm to enable supplementary materials such as vulcanizing agent to transfer from the solid rubber portion 123, blending of the supplementary materials becomes unnecessary. Therefore, it is desirable.

The thickness of the first adhesive layer 127 is adjusted to 0.1 to 2 mm. When it is less than 0.1 mm, the effect of the adhesive layer can hardly be obtained. When it exceeds 2 mm, the material cost is increased and moreover characteristics of the solid rubber portion are lost. Therefore, both of such thicknesses are not desirable.

Immediately after the formation of the main body of extruded article 121, PVC paste is coated on the first adhesive layer 127 with a paste coating apparatus 217.

(1) As a method for the coating, there can be employed, among generally used methods, flow coating (shower coating), brushing, roller coating, dip coating, spray coating, etc. When the surface to be coated is uneven or liable to be deformed, flow-coating is preferable.

(2) The thickness of the second adhesive layer 128 is adjusted to 50 to 100 μm. When it is less than 50 μm, a sufficient adhesive strength can hardly be obtained When it exceeds 100 μm, enhancement of the adhesive strength is far from acceptable; the adhesive strength is deteriorated. Moreover, the material cost is increased.

Next, a long, narrow strip of cloth 129 is pressure-bonded to the second adhesive layer 128.

In the example shown in the figures, this pressure-bonding step is carried out by pressure-bonding the strip of cloth 129 fed from a feed roll 218 for long, narrow strip of cloth, to the second adhesive layer 128 by means of a pair of press rolls 219. Although the pressure-bonding step is before a microwave vulcanization tank (UHF tank) 221, it may be between the UHF tank 221 and a hot-air vulcanization tank (HAV tank) 222.

The main body of extruded article 121 which has the strip of cloth 129 pressure-bonded to the second adhesive layer 128 is sent to a vulcanization step. In the vulcanization step, the second adhesive layer 128 is gelatinized by heating to complete pressure-bonding of the strip of cloth 129 to the rubber extruded article and union of them in a body.

In the example shown in the figures, the vulcanization step is composed of the UHF tank 221 and the HAV tank 222. After the vulcanization step, as in said example, the strip of cloth 219 is optionally embossed by means of embossing rolls 224 and then the extruded article is sent to a water-cooling step and a bending step. usually 200° C.×3–10 minutes. These conditions are sufficient to gelatinized the PVC paste by heating.

In the present inventive process for finishing into a cloth-like product, successive steps of formation of a weather strip by extrusion and vulcanization thereof can be employed, so that the productivity can be improved. That is, it is sufficient that immediately after forming by extrusion the main body of extruded article 121 which has the first adhesive layer 127, the PVC paste is coated on the first adhesive layer 127 to form the second adhesive layer 128, followed by pressure-bonding the long, narrow strip of cloth to the second adhesive layer and sending the extruded article to the vulcanization step.

The invention is described in further detail in the following non-limiting examples

EXAMPLE 1

Examples and comparative examples for confirming the effect of the present invention are explained below.

A main body of shaped article (width 35 mm×thickness 4 mm) whose surface had been covered with a adhesive layer (thickness: 0.4 mm) was formed by extrusion (extrusion rate: 5 m/min) with a cross-head type extruder (cylinder bore: 60 mm$\phi$, compression ratio: 1.5) by the use of a rubber material for the main body of shaped article according to the recipe shown in Table 1 and each rubber material for the adhesive layer listed in Table 10. Subsequently, a PVC paste (defoamed in vacuo) according to the recipe shown in Table 3 was coated on the top surface of the extruded product (the main body of shaped article) to thickness of 1 mm by a shower coating method to form a finishing coating layer (a PVC paste layer). Then, the extruded product was introduced into a hot-air tank, and vulcanization of the main body of shaped article 1 and the adhesive layer and gelatinization of the paste layer by heating were carried out at the same time under conditions of 20° C.×10 min.

The shaped articles of the examples and the comparative examples thus prepared were allowed to stand at room temperature for 24 hours. Then, for them, the adhesive strengths between the adhesive layer and the main body of shaped article and between the adhesive layer and the finishing coating layer were measured by a 180° peel test (rate of pulling: 10 cm/min).

From the results shown in Table 9, it can be seen that the adhesive properties of the adhesive layer of each example to the main body or shaped article and the finishing costing layer are satisfactory, and that when a ternary system containing SBR is used, the adhesive properties of the adhesive layer to the main body of shaped article are further improved Table 9 also shows the rubber properties of the adhesive layer which were measured in accordance with JIDS K-6301. It can be seen that when the proportion of SBR is excessive, the ozone resistance is low.

The finishing coating layer had a bright and subdued black color in all the shaped articles of the examples.

EXAMPLE 2

Rubber shaped articles of the present invention were prepared according to Example 1, except that PVC paste according to the recipe using a foaming agent shown in Table 4 was used.

From the test results shown in Table 9, it can be seen that the adhesive properties of the adhesive layer of each example to both the rubber substrate and the finishing costing layer are satisfactory, and that when a ternary system containing SBR is used, the adhesive properties of the adhesive layer to the rubber substrate are further improved.

Table 9 also shows the rubber properties of the adhesive layer which were measured in accordance with JIS K-6301. It can be seen that when the proportion of SBR is excessive, the ozone resistance is low.

In all the shaped articles of the examples, the finishing coating layer was excellent in feeling and had a subdued black color. Furthermore, the expansion ratio of the PVC gelatinized layer was about 2.

EXAMPLE 3

Rubber shaped articles of the present invention were prepared according to Example 1, except for using each rubber material for a adhesive layer listed in Table 11 and the material for a finishing coating layer listed in Table 5.

From the test results shown in Table 12, it can be seen that the adhesive, properties of the adhesive layer of each example to both the rubber substrate and the finishing coating layer are satisfactory, and that when a ternary system containing SBR is used, the adhesive properties of the adhesive layer to the rubber substrate are further improved.

Table 12 also shows the rubber properties of the adhesive layer which were measured in accordance with JIS K-6301. It can be seen that when the proportion of SBR is excessive, the ozone resistance is low.

In all the shaped articles of the examples, the finishing coating layer was excellent in feeling and had a subdued black color. Furthermore, the expansion ratio of the PVC gelatinized layer was about 2.

EXAMPLE 4

A rubber substrate (width 35 mm×thickness 4 mmt) whose top surface had been covered with an adhesive layer (thickness: 0.4 mm) was formed by extrusion (extrusion rate: 5 m/min) with a cross-head type extruder (cylinder ore: 60 mm$\phi$, compression ratio: 1.5) by the use of a rubber material for the rubber substrate according to the recipe shown in Table 1 and each rubber material for the adhesive layer listed in Table 10. Subsequently, a PVC paste (defoamed in vacuo) containing short fiber according to the recipe shown in Table 13 was coated on the top surface of the extruded product (the rubber substrate) to a thickness of 1 mm by a shower coating method to form a decorative coating layer (a PVC paste layer). Then, the extruded product was introduced into a hot-air tank, and vulcanization of the rubber substrate 1 and the adhesive layer and gelatinization of the paste layer were carried out at the same time under conditions of 200° C.×10 min.

The shaped articles of examples and comparative examples thus prepared were allowed to stand at room temperature for 24 hours. Then, for them, the adhesive strengths between the adhesive layer and the rubber substrate and between the adhesive layer and the decorative coating layer were measured by a 180° peel test (ate of pulling: 10 cm/min).

From the test results shown in Table 12, it can be seen that the adhesive properties of the adhesive layer of each example to both the rubber substrate and the decorative coating layer are satisfactory, and that when a ternary system containing SBR is used, the adhesive properties of the adhesive layer to the rubber substrate are further improved.

Table 12 also shows the rubber properties of the adhesive layer which were measured in accordance with JIS K-6301. It can be seen that when the proportion of SBR is excessive, the ozone resistance is low.

In all the shaped articles of the examples, the decorative coating layer was like a fabric excellent in feeling.

EXAMPLE 5

A rubber extruded portion (having a rectangular section of 35 mm in width and 4 mmt in thickness) was formed by co-extrusion together with an adhesive rubber layer (thickness: 0.4 mm) with a crosshead type extruder (cylinder bore: 60 mm$\phi$, compression ratio: 1.5) by the use of a rubber material for the rubber extruded portion according to the recipe shown in Table and each rubber material for the adhesive rubber layer listed in Table 10. The resulting extruded product was introduced into a hot-air tank and vulcanized with heating under conditions of 200° C.×10 min. Subsequently, a PVC composition according to the recipe shown in Table 4 was extrusion-coated (material delivery temperature: 170° C.) on the top surface, i.e., the adhesive rubber layer side, of the extruded product to a thickness of 1 mmt with an extruder (cylinder bore: 60 mmφ, L/D: 20) to form a resin extruded portion.

The shaped articles of examples and comparative examples thus prepared were allowed to stand at room temperature. Then, for them, the adhesive strengths between the adhesive rubber layer and the rubber extruded portion and between the resin extruded portion and the adhesive rubber portion were measured by a 180° peel test (rate of pulling: 10 cm/min).

From Table 9 showing the measurement results, it can be seen that the adhesive properties of the adhesive rubber layer of each example to both the rubber extruded portion and the resin extruded portion are satisfactory, and that when a ternary system containing SBR is used, the adhesive properties of the adhesive rubber layer to the rubber extruded portion are further improved.

Table 9 also shows the rubber properties of the adhesive rubber layer itself which were measured in accordance with JIS K-6301. It can be seen that when the proportion of SBR is excessive, the ozone resistance is low.

The finishing coating layer had a bright and subdued black color in all the shaped articles of the examples

EXAMPLE 6

A rubber substrate portion (having a rectangular section of 35 mm in width and 4 mmt in thickness) was formed by co-extrusion together with an adhesive rubber layer (thickness: 0.4 mm) with a cross-head type extruder (cylinder bore: 60 mmφ, compression ratio: 1.5) by the use of a rubber material for the rubber substrate proportion according to the recipe shown in Table 1 and each rubber material for the adhesive rubber layer shown in Table 10. Subsequently, a pulverized PVC composition ("Sumilit FLX", mfd. by Sumitomo Chemical Co., Ltd.) was sprinkled on the top surface, i.e., the adhesive rubber layer side, of the resulting extruded product by means of a vibrating feeder to form a PVC powder layer. Then, the extruded product was introduced into a hot-air tank and vulcanized with heating under conditions of 200° C.×10 min, whereby the rubber substrate portion and the adhesive rubber layer were vulcanized with heating and at the name time, the PVC powder layer was fused. Thereafter, the PVC powder layer was cooled and solidified to obtain a resin coating layer (1 mmt) on the rubber substrate portion.

The shaped articles of examples and comparative examples thus prepared were allowed to stand at room temperature for 24 hours. Then, for them, the adhesive strengths between the adhesive rubber layer and the rubber substrate portion and between the resin coating layer and the adhesive rubber layer were measured by a 180° peel test (rate of pulling: 10 cm/min).

From Table 9 showing the measurement results, it can be seen that the adhesive properties of the adhesive rubber layer of each example to both the rubber substrate portion and the resin coating layer are satisfactory, and that when a ternary system containing SBR is used, the adhesive properties of the adhesive rubber layer to the rubber substrate portion are further improved.

Table 9 also shows the rubber properties of the adhesive rubber layer itself which were measured in accordance with JIS K-6301. It can be seen that when the proportion of SBR is excessive, the ozone resistance is low.

The finishing coating layer had a bright and subdued black color in all the shaped articles of the examples.

EXAMPLE 7

A weather strip having the section shown in FIG. 12 (excepting the second adhesive layer 128 and the long, narrow strip of cloth 129; the thickness of the first adhesive layer: 0.4 mm) was formed by extrusion (extrusion rate: 5 m/min) with a cross-head type extruder (cylinder bore: 60 mmφ, compression ratio: 1.5) by the use of rubber materials for the solid rubber portion 123, the sponge rubber portion 125 and the first adhesive layer 127 according to recipes shown in Tables 1, 2 and 8, respectively. Then, a PVC paste (deformed in vacuo) according to the recipe shown in Table 5 was coated on the first adhesive layer 127 to a thickness of 100 μm by a shower coating method to form the second adhesive layer (a PVC paste layer) 128. A long, narrow strip of cloth (width: 40 mm, thickness: 2 mmt) of polyester woven fabric (plain weave) was pressure-bonded to the second adhesive layer 128. Thereafter, the extruded product was introduced into a HAV tank, and vulcanization and gelatinization by heating of the main body 121 of the extruded product and the adhesive layer 128 were carried out at the same time to complete the attachment of the strip of cloth 129 to the rubber extruded product and the incorporation thereof into the rubber extruded product.

The shaped articles of the present example thus prepared were allowed to stand at room temperature for 24 hours. Then, the adhesive strength of the strip of cloth 129 to the substrate (the rubber extruded product) was measured by a 180° peel test (rate of pulling: 10 cm/min) while holding the strip of cloth 129, to find that the peel strength was 2.3 kg/cm (the fracture of the substrate).

In the case of a rubber shaped article having such a finishing layer as formed in the present invention, pretreatments requiring a large number of steps, such as buffing, primer treatment, etc. have been necessary for attaining a good adhesion between the main body of the shaped article and the finishing layer formed of a gelatinized layer of PVC paste. On the other hand, in the case of the rubber shaped article having a finishing coating layer of the present invention, a good adhesion can be secured between the main body of the shaped article and the finishing coating layer without such pretreatments requiring a large number of steps, merely by forming an adhesive layer of specific blended rubber or a composition thereof between them. Therefore, a rubber shaped article having a finishing layer composed of a thermally gelatinized layer of PVC paste can be produced with high productivity.

In the case of the rubber shaped article of the present invention, when the PVC gelatinized layer is of a foamed type, softness can easily be imparted to the finishing layer with respect to touch and appearance, so that the demand for goods of higher grade can be sufficiently satisfied.

Moreover, when a foamed adhesive layer is used, the following effects are added:

(1) When the rubber shaped article is used as a weather strip or the like and attached to an actual automobile, it conforms well to the shape of a curved or bent portion of the car body.

(2) The transfer of agents for vulcanization (which have undesirable influences such as discoloration on the PVC gelatinized layer) from the rubber substrate to the PVC gelatinized layer is prevented by the absorption of the agents by the foamed adhesive layer, so that fears of, for example, discoloration of the PVC gelatinized layer, i.e., the finishing coating layer, are reduced.

(3) Very small depressions and protuberances formed in the adhesive layer by foaming affect the surface of the PVC gelatinized layer to facilitate delustering of the finishing coating layer.

Furthermore, when short fiber or natural leather powder is included in the PVC composition, attachment of cloth or leather becomes unnecessary. Therefore, it becomes possible to form a cloth-like or leather-like decorative surface on a rubber substrate made of EPDM with high productivity.

In the process for producing the rubber-resin composite of the present invention, the above-mentioned pretreatments requiring a large number of steps need not to be carried out on a rubber extruded portion. In detail, an adhesive rubber layer is formed of specific blended rubber or a composition thereof on the surface to be bonded of a rubber extruded portion by co-extrusion or continuous extrusion, and then a resin extruded portion is formed on the adhesive rubber layer while the adhesive rubber layer is hot. Merely by the above procedure, a good adhesion can be secured between the rubber extruded portion and the resin extruded portion. Moreover, the rubber extruded portion, the adhesive rubber layer and the resin extruded portion can be successively formed by extrusion. Therefore, a rubber-resin composite extruded article such as a weather strip having a finishing coating layer can be produced with high productivity.

The production process of the present invention is applicable also to such a weather strip as shown in FIG. 9 which is composed of a hollow seal portion (a rubber extruded portion) 85A made of EPDM and a trim portion (a resin extruded portion) 83A having an insert embedded therein. In this case, an adhesive rubber layer 89A is formed by extrusion on the surface to be bonded of the hollow seal portion 85A.

In the process for producing a rubber extruded article having a resin coating layer of the present invention, the above-mentioned pretreatment requiring a large number of steps need not to be carried out on a rubber substrate portion. In detail, an adhesive rubber layer is formed of specific blended rubber or a composition thereof on the surface to be decorated of the rubber substrate portion by co-extrusion or continuous extrusion, after which a pulverized PVC composition is sprinkled on the adhesive layer while the adhesive layer is hot or after it has been cooled, and then the rubber substrate portion thus treated is sent to a continuous vulcanization step. Merely by the above procedure, a good adhesion can be secured between the rubber substrate portion and the resulting resin coating layer. Therefore, a rubber extruded article having a resin coating layer, such as a weather strip having a finishing coating layer can be produced with high productivity.

In addition, the resin coating layer formed of the pulverized PVC composition tends to have a grave, attractive appearance, as compared with a resin coating layer formed of a conventional PVC composition.

The process of the present invention comprises only forming by extrusion a main body of extruded article 121 having a first adhesive layer 127, forming a second adhesive layer 128 by coating PVC paste immediately after the formation of the main body of extruded article 121, pressure-bonding a long, narrow strip of cloth 129 to the second adhesive layer 128, and sending the thus treated main body of extruded article 121 to a vulcanization step. Therefore, the productivity can be greatly improved The first adhesive layer 127, the second adhesive layer 128 and the strip of cloth 129 are strongly bonded to the solid rubber portion 123 of the main body of extruded article, the first adhesive layer 127 and the second adhesive layer 128, respectively. The resulting rubber shaped article has a sufficient practical strength, as described in the examples given above.

When there is desired a finishing layer having various cloth-like portions having a predetermined length in the direction of extrusion and their respective predetermined colors which are alternately different, or there is desired a finishing layer having cloth-like portions which are various in parallel with the direction of extrusion, it is sufficient that long, narrow strips of cloth are merely pressure-bonded to the second adhesive layer 128 in parallel with one another or alternately. Therefore, the productivity is high.

TABLE 1

| Unit | parts by weight |
|---|---|
| EPDM (JSREP 57C*) | 100 |
| MAF carbon black | 130 |
| Process oil (paraffinic) | 100 |
| Zinc oxide | 5 |
| Stearic acid | 1 |
| Dehydrating agent (CaO) | 5 |
| Vulcanization accelerator | 3.5 |
| Sulfur | 2 |

*Mfd. by Japan Synthetic Rubber Co., Ltd.

TABLE 2

| Unit | parts by weight |
|---|---|
| EPDM (JSR EP35*) | 100 |
| MAF carbon black | 80 |
| Calcium carbonate | 20 |
| Process oil (paraffinic) | 65 |
| Zinc oxide | 5 |
| Stearic acid | 1 |
| Dehydrating agent (CaO) | 5 |
| Foaming agent (OBSH-based) | 3 |
| Vulcanization accelerator | 3.5 |
| Sulfur | 1.5 |

*Mfd. by Japan Synthetic Rubber Co., Ltd.

TABLE 3

| Unit | parts by weight |
|---|---|
| Paste PVC resin (Sumilit PX-NHA)* | 100 |
| Plasticizer (DOP) | 80 |
| Zinc strearate (stabilizer) | 1 |
| Calcium stearate (stabilizer) | 2 |
| Carbon black (pigment) | 3 |

*Mfd. by Sumitomo Chemical Co., Ltd.

TABLE 4

| Unit | parts by weight |
|---|---|
| PVC (polymerization degree 1450) Tisso SH* | 100 |
| Plasticizer (DOP) | 50 |
| Calcium stearate | 20 |
| Stabilizer containing Ba and Zn | 2 |
| Carbon black | 2 |

*Mfd. by Tisso Co., Ltd.

TABLE 5

| Unit | parts by weight |
|---|---|
| Paste PVC resin (Sumilit PX-NHA*) | 100 |
| Plasticizer (DOP) | 80 |
| Zinc stearate (stabilizer) | 1 |
| Calcium stearate (stabilizer) | 2 |
| ADCA (foaming agent) | 2 |
| Pigment | 3 |

*Mfd. by Sumitomo Chemical Co., Ltd.

TABLE 6

| Unit | parts by weight |
|---|---|
| Paste PVC resin (Sumilit PX-NHA*) | 100 |
| Plasticizer (DOP) | 80 |
| Zinc stearate (stabilizer) | 1 |
| Calcium stearate (stabilizer) | 2 |
| Pigment | 3 |

*Mfd. by Sumitomo Chemical Co., Ltd.

TABLE 7

| Unit | parts by weight |
|---|---|
| Paste PVC resin (Sumilit PX-NHA*) | 100 |
| Plasticizer (DOP) | 80 |
| Zinc stearate (stabilizer) | 1 |
| Calcium stearate (stabilizer) | 2 |
| ADCA (foaming agent) | 2 |
| Pigment | 3 |

*Mfd. by Sumitomo Chemical Co., Ltd.

TABLE 8

| Unit | parts by weight |
|---|---|
| NBR (JSR N2305)* | 63 |
| EPDM (JSR EP35)* | 27 |
| SBR (JSR 1502)* | 10 |
| Stearic acid | 1 |
| Zinc oxide | 5 |
| Plasticizer (DOP) | 25 |
| Magnesium silicate (Mistron Vapor) | 75 |
| Polyethylene glycol (PEG 4000) | 2 |
| Defoaming agent (CaO) | 5 |
| Vulcanization accelerator | 3.2 |
| Sulfur | 1.5 |

*Mfd. by Japan Synthetic Rubber Co., Ltd.

TABLE 9*

| Item | Material | Com. Ex. 1 | Ex. 1 | Ex. 2 | Ex. 3 | Com. Ex. 2 | Com. Ex. 3 | Ex. 4 | Ex. 5 | Ex. 6 | Ex. 7 | Com. Ex. 4 |
|---|---|---|---|---|---|---|---|---|---|---|---|---|
| Physical properties of adhesive layer | Tensile strength (Kg/cm²) | 88 | 85 | 83 | 83 | 81 | 80 | 82 | 83 | 85 | 87 | 88 |
| | Elongation (%) | 570 | 600 | 610 | 610 | 630 | 640 | 600 | 570 | 570 | 580 | 580 |
| | Hardness (JISA) | 56 | 55 | 54 | 54 | 53 | 52 | 55 | 55 | 55 | 56 | 56 |
| | Ozone resistance** | cracked | N.C. | N.C. | N.C. | N.C. | N.C. | N.C. | N.C. | N.C. | N.C. | cracked |
| Adhesion between adhesive layer and main body of shaped article | Peel strength (Kg/10 mm) | 0.2 | 1.0 | 1.4 | 1.5 | 2.0 | 2.5 | 2.2 | 2.3 | 2.2 | 2.1 | 2.2 |
| | State of fracture | FBS | FBS | PFBS | PFBS | FM | FM | FM | FM | FM | FM | FM |
| Adhesion between adhesive layer and finishing coating layer | Peel strength (Kg/10 mm) | 2.4 | 2.2 | 2.2 | 2.1 | 0.7 | 0.3 | 2.2 | 2.1 | 2.0 | 2.1 | 2.0 |
| | State of fracture | FM | FM | FM | FM | FBS | FBS | FM | FM | FM | FM | FM |

*NC = No crack
FBS = Fracture of boundary surface
**50 pphm, 20% elongation, 40° C., 70 hr
FM = Fracture of material
PFBS = Partial fracture of boundary surface

TABLE 10

| | Com. Ex. 1 | Ex. 1 | Ex. 2 | Ex. 3 | Com. Ex. 2 | Com. Ex. 3 | Ex. 4 | Ex. 5 | Ex. 6 | Ex. 7 | Com. Ex. 4 |
|---|---|---|---|---|---|---|---|---|---|---|---|
| NBR (JSR N230S) | 100 | 80 | 60 | 40 | 20 | 0 | 67 | 63 | 56 | 49 | 42 |
| EPDM (JSR EP35) | 0 | 20 | 40 | 60 | 80 | 100 | 28 | 27 | 24 | 21 | 18 |
| SBR (JSR 1502) | — | — | — | — | — | — | 5 | 10 | 20 | 30 | 40 |
| Stearic Acid | 1 | 1 | 1 | 1 | 1 | 1 | 1 | 1 | 1 | 1 | 1 |
| Zinc Oxide | 5 | 5 | 5 | 5 | 5 | 5 | 5 | 5 | 5 | 5 | 5 |
| Plasticizer (DOP) | 25 | 25 | 25 | 25 | 25 | 25 | 25 | 25 | 25 | 25 | 25 |
| Magnesium silicate | 75 | 75 | 75 | 75 | 75 | 75 | 75 | 75 | 75 | 75 | 75 |
| Polyethylene glycol (PEG 4000) | 2 | 2 | 2 | 2 | 2 | 2 | 2 | 2 | 2 | 2 | 2 |
| Dehydrating agent (CaO) | 5 | 5 | 5 | 5 | 5 | 5 | 5 | 5 | 5 | 5 | 5 |
| Vulcanization accelerator | 3.2 | 3.2 | 3.2 | 3.2 | 3.2 | 3.2 | 3.2 | 3.2 | 3.2 | 3.2 | 3.2 |
| Sulfur | 1.5 | 1.5 | 1.5 | 1.5 | 1.5 | 1.5 | 1.5 | 1.5 | 1.5 | 1.5 | 1.5 |

TABLE 11

|  | Com. Ex. 1 | Ex. 1 | Ex. 2 | Ex. 3 | Com. Ex. 2 | Com. Ex. 3 | Ex. 4 | Ex. 5 | Ex. 6 | Ex. 7 | Com. Ex. 4 |
|---|---|---|---|---|---|---|---|---|---|---|---|
| NBR (JSR N230S) | 100 | 80 | 60 | 40 | 20 | 0 | 67 | 63 | 56 | 49 | 42 |
| EPDM (JSR EP35) | 0 | 20 | 40 | 60 | 80 | 100 | 28 | 27 | 24 | 21 | 18 |
| SBR (JSR 1502) | — | — | — | — | — | — | 5 | 10 | 20 | 30 | 40 |
| Stearic Acid | 1 | 1 | 1 | 1 | 1 | 1 | 1 | 1 | 1 | 1 | 1 |
| Zinc Oxide | 5 | 5 | 5 | 5 | 5 | 5 | 5 | 5 | 5 | 5 | 5 |
| Plasticizer (DOP) | 25 | 25 | 25 | 25 | 25 | 25 | 25 | 25 | 25 | 25 | 25 |
| Magnesium silicate (Microtron vapor) | 75 | 75 | 75 | 75 | 75 | 75 | 75 | 75 | 75 | 75 | 75 |
| Polyethylene glycol (PEG 4000) | 2 | 2 | 2 | 2 | 2 | 2 | 2 | 2 | 2 | 2 | 2 |
| Deforming agent (CaO) | 5 | 5 | 5 | 5 | 5 | 5 | 5 | 5 | 5 | 5 | 5 |
| Vulcanization accelerator | 3.2 | 3.2 | 3.2 | 3.2 | 3.2 | 3.2 | 3.2 | 3.2 | 3.2 | 3.2 | 3.2 |
| Sulfur | 1.5 | 1.5 | 1.5 | 1.5 | 1.5 | 1.5 | 1.5 | 1.5 | 1.5 | 1.5 | 1.5 |
| Foaming agent (OBSH) | 3 | 3 | 3 | 3 | 3 | 3 | 3 | 3 | 3 | 3 | 3 |

TABLE 12*

| Item | Material | Com. Ex. 1 | Ex. 1 | Ex. 2 | Ex. 3 | Com. Ex. 2 | Com. Ex. 3 | Ex. 4 | Ex. 5 | Ex. 6 | Ex. 7 | Com. Ex. 4 |
|---|---|---|---|---|---|---|---|---|---|---|---|---|
| Physical properties of adhesive layer | Tensile strength (Kg/cm$^2$) | 29 | 27 | 26 | 26 | 25 | 25 | 26 | 26 | 26 | 27 | 29 |
| | Elongation (%) | 190 | 200 | 200 | 200 | 210 | 210 | 200 | 190 | 190 | 200 | 200 |
| | Ozone resistance** | cracked | N.C. | N.C. | N.C. | N.C. | N.C. | N.C. | N.C. | N.C. | N.C. | cracked |
| Adhesion between adhesive layer and rubber substrate | Peel strength (Kg/10 mm) | 0.2 | 0.5 | 0.7 | 0.8 | 1.0 | 1.3 | 1.1 | 1.2 | 1.1 | 1.0 | 1.1 |
| | State of fracture | FBS | FBS | PFBS | PFBS | FM | FM | FM | FM | FM | FM | FM |
| Adhesion between adhesive layer and finishing coating layer | Peel strength (Kg/10 mm) | 1.0 | 0.9 | 0.9 | 0.8 | 0.3 | 0.1 | 0.9 | 0.8 | 0.8 | 0.8 | 0.7 |
| | State of fracture | FM | FM | FM | FM | FBS | FBS | FM | FM | FM | FM | FM |

*NC = No crack
FBS = Fracture of boundary surface
**50 pphm, 20% elongation, 40° C., 70 hr
FM = Fracture of material
PFBS = Partial fracture of boundary surface

TABLE 13

| Unit | parts by weight |
|---|---|
| Paste PVC resin (Sumilit PX-NHA*) | 100 |
| Plasticizer (DOP) | 100 |
| Zinc stearate (stabilizer) | 1 |
| Calcium stearate (stabilizer) | 2 |
| Carbon black (pigment) | 3 |
| PNylon pile (1.5 d, 1 = 0.5 mm) | 50 |

*Mfd. by Sumitomo Chemical Co., Ltd.

All publications mentioned hereinabove are hereby incorporated in their entirety by reference.

While the foregoing invention has been described in some detail for clarity and understanding, it will be appreciated by one skilled in the art from a reading of this disclosure that various changes in form and detail can be without departing from the true scope of the invention and appended claims.

What is claimed is:

1. An article of manufacture comprising
   (a) an EPDM rubber substrate,
   (b) a PVC layer formed on the substrate, and
   (c) an adhesive layer binding the PVC layer to the substrate comprising a rubber blend of NBR, EPDM, and optionally SBR.

2. The article of manufacture according to claim 1, wherein said article of manufacture comprises a rubber shaped article having a finishing layer which comprises
   a main body of rubber shaped article made of EPDM;
   a finishing layer of a PVC composition formed on the main body and
   an adhesive layer formed between the main body and the finishing layer, said adhesive layer comprising 40 to 80% by weight of NBR, 20 to 40% by weight of EPDM and 0 to 35% by weight of SBR.

3. A rubber shaped article according to claim 2, wherein the PVC composition for the finishing layer is of a foamed type.

4. A rubber shaped article according to claim 2 or 3, wherein the adhesive layer is of a foamed type.

5. A rubber shaped article according to claim 2, wherein the finishing layer contains short fiber or natural leather powder and is like fabric or leather.

6. A process for producing an article of manufacture comprising a main body made of EPDM compounded rubber and a PVC layer formed on the substrate which are united in a body through an adhesive layer, said process comprising a step of forming the adhesive layer which comprises
a rubber blend of NBR, EPDM, and optionally
SBR, on said main body of shaped article;
a step of forming the finishing layer of the PVC layer
in the adhesive layer;
a vulcanization step; and
a heating step.

7. The process according to claim 6, wherein said process comprises producing a rubber shaped article comprising a main body of rubber shaped article made of EPDM-based compounded rubber and a finishing layer made of PVC composition which are united in a body through an adhesive layer, said process comprising a step of forming the adhesive layer which comprises 40 to 80% by weight of NBR, 20 to 40% by weight of EPDM and 0 to 35% by weight of SBR, on said main body of shaped article;
a step of forming the finishing layer of the PVC composition on the adhesive layer;
a vulcanization step; and
a heating step.

8. A process according to claim 7, wherein the step of vulcanization with heating is carried out after the step of forming the adhesive layer on the main body of shaped article, and the step of forming the finishing layer is carried out immediately after the step of vulcanization with heating.

9. A process according to claim 7, wherein the step of forming the finishing layer is carried out by sprinkling pulverized PVC on the adhesive layer.

10. A process according to claim 7, wherein the step of forming the finishing layer is carried out by coating the PVC composition on the adhesive layer.

* * * * *